(12) United States Patent
Sakhpara

(10) Patent No.: US 7,542,563 B2
(45) Date of Patent: Jun. 2, 2009

(54) RETRACTABLE HEADSET FOR AN AUDIO PLAYBACK SYSTEM

(75) Inventor: Ketul Sakhpara, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 11/153,196

(22) Filed: Jun. 15, 2005

(65) Prior Publication Data

US 2006/0286932 A1    Dec. 21, 2006

(51) Int. Cl.
H04M 1/00 (2006.01)
H04M 9/00 (2006.01)
H04R 25/00 (2006.01)

(52) U.S. Cl. ............ 379/430; 381/370; 455/550.1

(58) Field of Classification Search .......... 379/430; 381/370, 374, 375, 384, 394, 395; 455/550.1
See application file for complete search history.

(56) References Cited

U.S. PATENT DOCUMENTS

| 5,724,667 | A  | * | 3/1998  | Furuno    | 455/575.2 |
| 6,301,487 | B1 | * | 10/2001 | Nakamura  | 455/550.1 |
| 2004/0174249 | A1 | * | 9/2004  | Kusubashi | 340/7.4 |
| 2006/0092773 | A1 | * | 5/2006  | Hsu et al. | 369/30.01 |

* cited by examiner

*Primary Examiner*—Curtis Kuntz
*Assistant Examiner*—Tuan D Nguyen

(57) ABSTRACT

An improved headset system for an audio playback system is provided. The headset system is integrated into the audio playback system and comprises a headset, a cord compartment, and a cord retractor. The headset comprises an earbud that is operable to provide audio information and a cord that is operable to couple the headset to the audio playback system. The cord compartment is operable to store the cord in the audio playback system. The cord is also operable to be pulled from the cord compartment. The cord retractor is coupled to the cord compartment and is operable to retract the cord into the cord compartment.

14 Claims, 2 Drawing Sheets

RETRACTABLE HEADSET FOR AN AUDIO PLAYBACK SYSTEM

TECHNICAL FIELD OF THE INVENTION

The present invention relates generally to audio playback systems and, more specifically, to an improved headset for an audio playback system.

BACKGROUND OF THE INVENTION

Audio playback systems, including cellular phones, paging devices, personal communication services (PCS) systems, wireless data networks, portable stereo receivers, portable CD players, portable MP3 players, and the like, have become ubiquitous in society. To attract new customers, manufacturers continually seek to make these devices cheaper and better, such as by providing various accessories for the devices.

One accessory that is becoming more important is a headset that allows an audio playback system to be used as a hands-free device. Not only do headsets make it easier for users to move around while listening to audio information provided by the audio playback systems, but some states are enacting laws requiring the use of hands-free cellular telephones for users talking on a cellular telephone while driving.

However, currently available headsets for audio playback systems have several disadvantages associated with them. For example, the wire of the headset may become entangled with other devices in the user's pocket or purse. In addition, detachable headsets may be forgotten at work, in the user's car, or elsewhere. When this occurs, the headsets are unavailable for use until retrieved. Another problem with currently available headsets is that many headsets may be purchased and used with an audio playback system that have not been designed to work properly with that particular audio playback system. Some of these headsets may cause the audio playback system to malfunction.

Therefore, there is a need in the art for an improved headset for use in an audio playback system. In particular, there is a need for a headset that solves the problems of entanglement of wires, forgotten headsets, and use of incompatible headsets.

SUMMARY OF THE INVENTION

In accordance with the present invention, a retractable headset for an audio playback system and method are provided that substantially eliminate or reduce disadvantages and problems associated with conventional methods and systems.

To address the above-discussed deficiencies of the prior art, it is a primary object of the present invention to provide a headset system integrated into an audio playback system. According to an advantageous embodiment of the present invention, the headset system comprises a headset, a cord compartment, and a cord retractor. The headset comprises an earbud that is operable to provide audio information and a cord that is operable to couple the headset to the audio playback system. The cord compartment is operable to store the cord in the audio playback system. The cord is also operable to be pulled from the cord compartment. The cord retractor is coupled to the cord compartment and is operable to retract the cord into the cord compartment.

According to one embodiment of the present invention, the audio playback system comprises a portable stereo receiver.

According to another embodiment of the present invention, the audio playback system comprises a portable CD player.

According to still another embodiment of the present invention, the audio playback system comprises a portable MP3 player.

According to yet another embodiment of the present invention, the cord retractor comprises a spring-based rolling mechanism.

According to a further embodiment of the present invention, the headset system comprises a lock button that is operable to prevent the cord retractor from retracting the cord into the cord compartment when the lock button is in a locked position and to allow the cord retractor to retract the cord into the cord compartment when the lock button is in an unlocked position.

According to a still further embodiment of the present invention, the lock button is further operable to prevent the cord from being pulled from the cord compartment when the lock button is in the locked position and to allow the cord to be pulled from the cord compartment when the lock button is in the unlocked position.

According to yet a further embodiment of the present invention, the lock button is also operable to switch automatically from the locked position to the unlocked position based on a triggering event.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
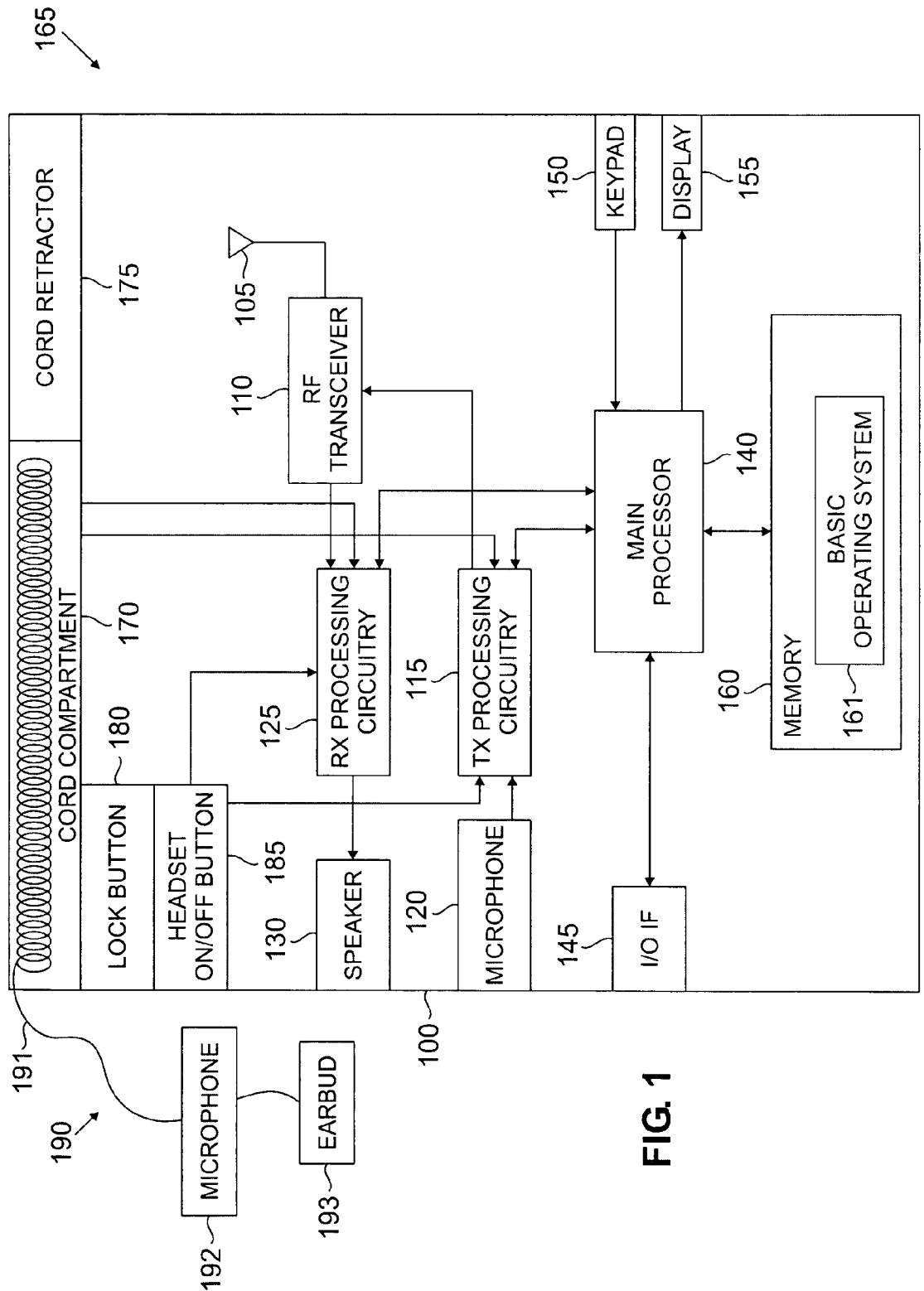
FIG. 1 illustrates an exemplary audio playback system comprising an integrated headset system according to an advantageous embodiment of the present invention.
Figure 2:
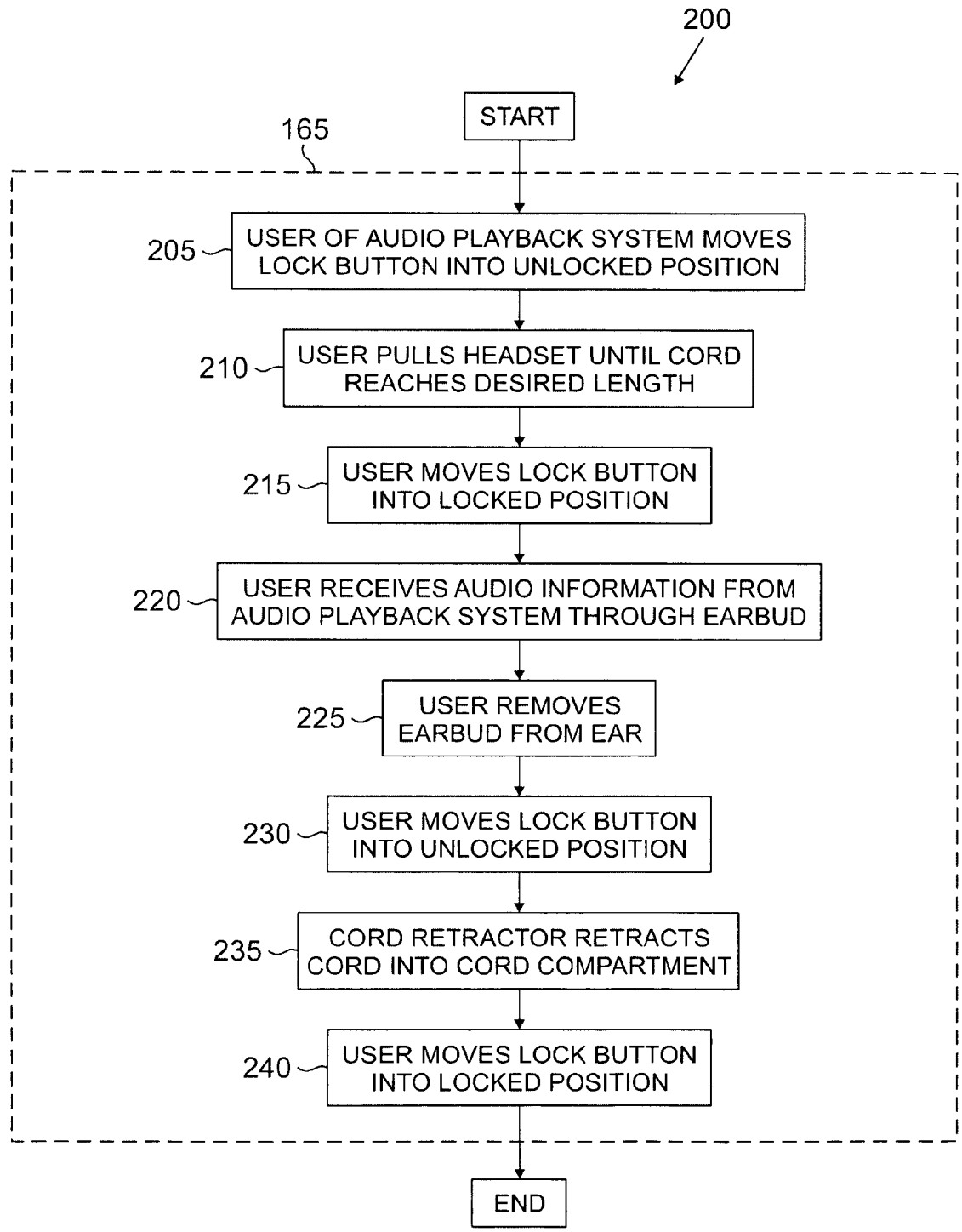
FIG. 2 is a flow diagram illustrating a method for operating the headset system of FIG. 1 according to the principles of the present invention.

FIGS. 1 through 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged audio playback system.

FIG. 1 illustrates wireless audio playback system 100 according to an advantageous embodiment of the present invention. For the illustrated and described embodiment, audio playback system 100 comprises a cellular telephone. However, it will be understood that audio playback system 100 may also comprise a portable stereo receiver, such as a Sony Walkman, a portable CD player, a portable MP3 player, such as an ipod, or the like without departing from the scope of the present invention.

Wireless audio playback system 100 comprises antenna 105, radio frequency (RF) transceiver 110, transmit (TX) processing circuitry 115, microphone 120, and receive (RX) processing circuitry 125. MS 100 also comprises speaker 130, main processor 140, input/output (I/O) interface (IF) 145, keypad 150, display 155, memory 160, and headset system 165. Memory 160 further comprises basic operating system (OS) program 161.

Radio frequency (RF) transceiver 110 receives from antenna 105 an incoming RF signal transmitted by a base station of wireless network 100. Radio frequency (RF) transceiver 110 down-converts the incoming RF signal to produce an intermediate frequency (IF) or a baseband signal. The IF or baseband signal is sent to receiver (RX) processing circuitry 125 that produces a processed baseband signal by filtering, decoding, and/or digitizing the baseband or IF signal. Receiver (RX) processing circuitry 125 transmits the processed baseband signal to speaker 130 or headset system 165 (i.e., voice data) or to main processor 140 for further processing (e.g., web browsing).

Transmitter (TX) processing circuitry 115 receives analog or digital voice data from microphone 120 or headset system 165 or other outgoing baseband data (e.g., web data, e-mail, interactive video game data) from main processor 140. Transmitter (TX) processing circuitry 115 encodes, multiplexes, and/or digitizes the outgoing baseband data to produce a processed baseband or IF signal. Radio frequency (RF) transceiver 110 receives the outgoing processed baseband or IF signal from transmitter (TX) processing circuitry 115. Radio frequency (RF) transceiver 110 up-converts the baseband or IF signal to a radio frequency (RF) signal that is transmitted via antenna 105.

In an advantageous embodiment of the present invention, main processor 140 is a microprocessor or microcontroller. Memory 160 is coupled to main processor 140. According to an advantageous embodiment of the present invention, part of memory 160 comprises a random access memory (RAM) and another part of memory 160 comprises a Flash memory, which acts as a read-only memory (ROM).

Main processor 140 executes basic operating system (OS) program 161 stored in memory 160 in order to control the overall operation of wireless audio playback system 100. In one such operation, main processor 140 controls the reception of forward channel signals and the transmission of reverse channel signals by radio frequency (RF) transceiver 110, receiver (RX) processing circuitry 125, and transmitter (TX) processing circuitry 115, in accordance with well-known principles.

Main processor 140 is capable of executing other processes and programs resident in memory 160. Main processor 140 can move data into or out of memory 160, as required by an executing process. Main processor 140 is also coupled to I/O interface 145. I/O interface 145 provides audio playback system 100 with the ability to connect to other devices such as laptop computers and handheld computers. I/O interface 145 is the communication path between these accessories and main controller 140.

Main processor 140 is also coupled to keypad 150 and display unit 155. The operator of audio playback system 100 uses keypad 150 to enter data into audio playback system 100. Display 155 may be a liquid crystal display capable of rendering text and/or at least limited graphics from web sites. Alternate embodiments may use other types of displays.

Headset system 165 comprises a cord compartment 170, a cord retractor 175, a lock button 180, a headset on/off button 185, and a headset 190. Headset 190 comprises a cord 191, a microphone 192, and an earbud 193. Cord compartment 170 comprises a space within audio playback system 100 that is operable to store cord 191 when headset 190 is not in use.

Cord compartment 170 may be located near the upper end of the body of audio playback system 100, such as within the upper quarter of audio playback system 100. For a particular example, cord compartment 170 may be located within or adjacent to the hinged portion of a audio playback system 100 that may be folded in half. It will be understood that cord compartment 170 may be otherwise suitably located without departing from the scope of the present invention.

Cord retractor 175 is coupled to cord compartment 170 and is operable to apply pressure to headset 190 such that cord 191 may be pulled into cord compartment 170 by cord retractor 175. For one embodiment, cord retractor 175 may comprise a spring-based rolling mechanism. However, it will be understood that cord retractor 175 may comprise any other suitable retracting mechanism without departing from the scope of the present invention. Cord retractor 175 may be located adjacent to cord compartment 170, within cord compartment 170, or in any other suitable location.

Lock button 180 is operable to be moved into a locked position in order to lock headset 190 in place by preventing cord retractor 175 from pulling cord 191 into cord compartment 170. When in an unlocked position, lock button 180 has no affect on cord retractor 175 such that cord retractor 175 may retract cord 191 into cord compartment 170. When in the locked position, lock button 180 is also operable to prevent cord 191 from being pulled by a user of audio playback system 100 from cord compartment 170 when headset 190 is not in use. Similarly, when in the unlocked position, lock button 180 has no affect on cord 191 such that cord 191 may be pulled from cord compartment 170.

For some embodiments, lock button 180 may be operable to switch automatically from the locked position to the unlocked position based on any suitable triggering event. For example, for the embodiment in which audio playback system 100 comprises a cellular telephone, a cordless telephone, or the like, the triggering event may comprise an incoming telephone call. In addition, for the embodiment in which audio playback system 100 comprises a portable stereo receiver, a portable CD player, a portable MP3 player, or the like, the triggering event may comprise a user activating the audio playback system 100, pressing a "play" button, or other suitable event operable to begin audio playback.

For these embodiments and/or for other embodiments, it will be understood that lock button 180 may be able to switch from the locked to the unlocked position and vice versa without being physically moved. For example, lock button 180 may switch between positions based on a signal generated by a user pushing lock button 180 to toggle lock button 180 from one position to the other. For another example, lock button 180 may switch between positions in response to an application running on audio playback system 100 that is operable to provide a switching signal to lock button 180 based on a triggering event. It will be understood that lock button 180 may also switch between positions as described in both of these examples and/or in any other suitable manner.

Headset on/off button 185 is operable to activate and deactivate headset 190. When headset on/off button 185 activates headset 190, transmitter processing circuitry 115 receives analog or digital voice data from microphone 192 of headset 190 and receiver processing circuitry 125 transmits the processed baseband signal to earbud 193 of headset 190. Similarly, when headset on/off button 185 deactivates headset 190, transmitter processing circuitry 115 receives analog or digital voice data from microphone 120 and receiver processing circuitry 125 transmits the processed baseband signal to speaker 130.

Thus, microphone 192 is operable to collect audio information to be sent from audio playback system 100 to, for example, another cellular telephone, and earbud 193 is operable to be placed in or near the ear of the user of audio playback system 100 and to provide audio information from audio playback system 100 to the user.

FIG. 2 depicts flow diagram 200, which illustrates the operation of headset system 165 according to the principles of the present invention. Initially, a user of audio playback system 100 decides to use headset 190 for receiving audio information from audio playback system 100 and, if lock button 180 is in the locked position to prevent cord 191 from being pulled from cord compartment 170, the user moves lock button 180 into the unlocked position (process step 205). For an alternative embodiment, lock button 180 may automatically switch to the unlocked position based on a triggering event.

The user of audio playback system 100 then pulls headset 190 until cord 191 is long enough for the user to comfortably place earbud 193 in or near his or her ear (process step 210). When cord 191 is long enough, the user locks headset 190 in place by moving lock button 180 into the locked position (process step 215). The user may then receive audio information from audio playback system 100 through earbud 193 of headset 190 as long as desired (process step 220).

When the user is finished receiving audio information from audio playback system 100, the user removes earbud 193 from his or her ear (process step 225) and moves lock button 180 into the unlocked position (process step 230). Cord retractor 175 then retracts cord 191 into cord compartment 170 (process step 235). Finally, if the user wishes to prevent cord 191 from being pulled from cord compartment 170 when headset 190 is not in use, the user moves lock button 180 into the locked position (process step 240).

Although the present invention has been described with an exemplary embodiment, various changes and modifications may be suggested to one skilled in the art. It is intended that the present invention encompass such changes and modifications as fall within the scope of the appended claims.

What is claimed is:

1. A headset system integrated into an audio playback system, comprising: a headset comprising an earbud operable to provide audio information and a cord operable to couple the headset to the audio playback system; a cord compartment operable to store the cord in the audio playback system, the cord further operable to be pulled from the cord compartment; a lock button capable of switching from a locked position to an unlocked position without being physically moved; a headset on/off button; a cord retractor coupled to the cord compartment, the cord retractor operable to retract the cord into the cord compartment; wherein the lock button further operable to prevent the cord from being pulled from the cord compartment when the lock button is in the locked position and to allow the cord to be pulled from the cord compartment when the lock button is in the unlocked position and further operable to switch automatically from the locked position to the unlocked position based on a triggering event.

2. The headset system as set forth in claim 1, the audio playback system comprising a portable stereo receiver.

3. The headset system as set forth in claim 1, the audio playback system comprising a portable CD player.

4. The headset system as set forth in claim 1, the audio playback system comprising a portable MP3 player.

5. The headset system as set forth in claim 1, the cord retractor comprising a spring-based rolling mechanism.

6. The headset system as set forth in claim 1, wherein the lock button is operable to prevent the cord retractor from retracting the cord into the cord compartment when the lock button is in a locked position and to allow the cord retractor to retract the cord into the cord compartment when the lock button is in an unlocked position.

7. A headset system integrated into a cellular telephone, comprising: a headset comprising a microphone operable to collect audio information, an earbud operable to provide audio information, and a cord operable to couple the headset to a mobile station; a cord compartment operable to store the cord in the mobile station, the cord further operable to be pulled from the cord compartment; a lock button capable of switching from a locked position to an unlocked position without being physically moved; a headset on/off button; a cord retractor coupled to the cord compartment, the cord retractor operable to retract the cord into the cord compartment and wherein the lock button further operable to prevent the cord from being pulled from the cord compartment when the lock button is in the locked position and to allow the cord to be pulled from the cord compartment when the lock button is in the unlocked position and further operable to switch automatically from the locked position to the unlocked position based on a triggering even.

8. The headset system as set forth in claim 7, the cord retractor comprising a spring-based rolling mechanism.

9. The headset system as set forth in claim 7, wherein the lock button is operable to prevent the cord retractor from retracting the cord into the cord compartment when the lock button is in the locked position.

10. The headset system as set forth in claim 9, the lock button further operable to allow the cord retractor to retract the cord into the cord compartment when the lock button is in the unlocked position.

11. The headset system as set forth in claim 10, the triggering event comprising an incoming call.

12. A method for operating a headset system integrated into an audio playback system comprising the steps of: allowing a headset to be pulled by a user of the audio playback system, the headset comprising a cord operable to be stored in the audio playback system, until the headset is a desired length from the audio playback system and turning the headset on with a headset on/off button; locking the headset with a lock button in place when the headset is the desired length from the audio playback system, wherein the lock button is capable of locking the headset without being physically moved; further preventing the headset from being pulled when a lock button is in a locked position, allowing the headset to be pulled comprising allowing the headset to be pulled when the lock button is in an unlocked position, and automatically switching from the locked position to the unlocked position based on a triggering event.

13. The method as set forth in claim 12, further comprising:
unlocking the headset; and
retracting the cord into a cord compartment in the audio playback system when the headset is unlocked.

14. The method as set forth in claim 13, retracting the cord into the cord compartment comprising retracting the cord into the cord compartment using a spring-based rolling mechanism.

* * * * *